US009683113B2

(12) United States Patent
Ganapathiappan et al.

(10) Patent No.: US 9,683,113 B2
(45) Date of Patent: Jun. 20, 2017

(54) PIGMENT PARTICLES CONTAINING A VINYL GROUP AND ENCAPSULATED BY A CROSS-LINKED POLYMER

(71) Applicant: Hewlett-Packard Development Company, L.P., Houston, TX (US)

(72) Inventors: Sivapackia Ganapathiappan, Los Altos, CA (US); Hou T. Ng, Campbell, CA (US); Howard S. Tom, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 621 days.

(21) Appl. No.: 13/668,510

(22) Filed: Nov. 5, 2012

(65) Prior Publication Data
US 2013/0065996 A1    Mar. 14, 2013

Related U.S. Application Data

(63) Continuation-in-part of application No. 12/862,888, filed on Aug. 25, 2010, now abandoned.

(51) Int. Cl.
| C09D 11/322 | (2014.01) |
| C08K 9/10 | (2006.01) |
| C09D 7/12 | (2006.01) |
| C09C 1/46 | (2006.01) |
| C09C 1/48 | (2006.01) |
| C09C 3/10 | (2006.01) |
| C09D 11/324 | (2014.01) |
| C09D 11/326 | (2014.01) |

(52) U.S. Cl.
CPC .............. *C09D 7/1225* (2013.01); *C09C 1/46* (2013.01); *C09C 1/48* (2013.01); *C09C 3/10* (2013.01); *C09D 11/324* (2013.01); *C09D 11/326* (2013.01)

(58) Field of Classification Search
None
See application file for complete search history.

(56) References Cited

U.S. PATENT DOCUMENTS

| 5,416,145 A | 5/1995 | Askeland et al. |
| 5,792,249 A | 8/1998 | Shirota et al. |
| 6,398,329 B1 | 6/2002 | Boyd et al. |

(Continued)

FOREIGN PATENT DOCUMENTS

| CN | 1316472 | 10/2001 |
| CN | 1506153 | 6/2004 |

(Continued)

OTHER PUBLICATIONS

Yang, Qiang, et al. "Preparation of polymer-grafted carbon black nanoparticles by surface-initiated atom transfer radical polymerization." Journal of Polymer Science Part A: Polymer Chemistry 45.15 (2007): 3451-3459.

(Continued)

*Primary Examiner* — Vu A Nguyen
(74) *Attorney, Agent, or Firm* — HP Inc. Patent Department

(57) ABSTRACT

Pigment particles containing a vinyl group are encapsulated by a cross-linked polymer, wherein the polymer has a dielectric constant of 2.8 or more. An inkjet ink containing the pigment particles is also described.

12 Claims, 1 Drawing Sheet

(56) References Cited

U.S. PATENT DOCUMENTS

| | | |
|---|---|---|
| 6,740,689 B1 | 5/2004 | Lee et al. |
| 6,908,185 B2 | 6/2005 | Chen et al. |
| 7,018,459 B2 | 3/2006 | Doi et al. |
| 7,119,133 B2 * | 10/2006 | Vincent ................ C09D 11/32 523/160 |
| 7,303,616 B2 | 12/2007 | Oki et al. |
| 7,393,397 B2 | 7/2008 | Ham |
| 7,459,491 B2 | 12/2008 | Tyvoll et al. |
| 8,133,934 B2 | 3/2012 | Liu et al. |
| 8,182,597 B2 | 5/2012 | Robertson et al. |
| 8,974,049 B2 | 3/2015 | Prasad et al. |
| 2002/0185033 A1 | 12/2002 | Shepard |
| 2003/0029355 A1 | 2/2003 | Miyabayashi |
| 2003/0050362 A1 | 3/2003 | Sakai et al. |
| 2003/0101904 A1 | 6/2003 | Morris et al. |
| 2004/0186200 A1 | 9/2004 | Yatake |
| 2004/0257418 A1 | 12/2004 | Doi |
| 2005/0075416 A1 * | 4/2005 | Miyabayashi ................ 523/160 |
| 2005/0090582 A1 | 4/2005 | Ushirogouchi et al. |
| 2005/0142306 A1 | 6/2005 | Uhlir-Tsang et al. |
| 2006/0211791 A1 | 9/2006 | Burns et al. |
| 2006/0233976 A1 | 10/2006 | Uhlir-Tsang et al. |
| 2007/0098927 A1 | 5/2007 | Uhlir-Tsang et al. |
| 2008/0026221 A1 | 1/2008 | Vincent et al. |
| 2008/0043079 A1 | 2/2008 | Ikeda et al. |
| 2008/0146729 A1 * | 6/2008 | Yatake ................ C09D 11/322 524/556 |
| 2010/0104756 A1 | 4/2010 | Nagano |
| 2012/0176443 A1 | 7/2012 | Robertson et al. |
| 2012/0249623 A1 | 10/2012 | Vasudevan et al. |

FOREIGN PATENT DOCUMENTS

| | | |
|---|---|---|
| CN | 101052690 | 10/2007 |
| CN | 101426657 | 5/2009 |
| EP | 1142968 | 10/2001 |
| EP | 1715011 | 10/2006 |
| JP | 2004123904 | 4/2004 |
| JP | 2007197525 | 8/2007 |
| WO | WO-2004065475 | 8/2004 |
| WO | WO-2005095531 | 10/2005 |
| WO | 2006036367 | 4/2006 |
| WO | WO-2006041658 | 4/2006 |
| WO | 2011099977 | 8/2011 |

OTHER PUBLICATIONS

HP Business Inkjet 2200/2250 user's guide, Aug. 2000, http://www.hp.com/go/businessinkjet, 75 pages.

* cited by examiner

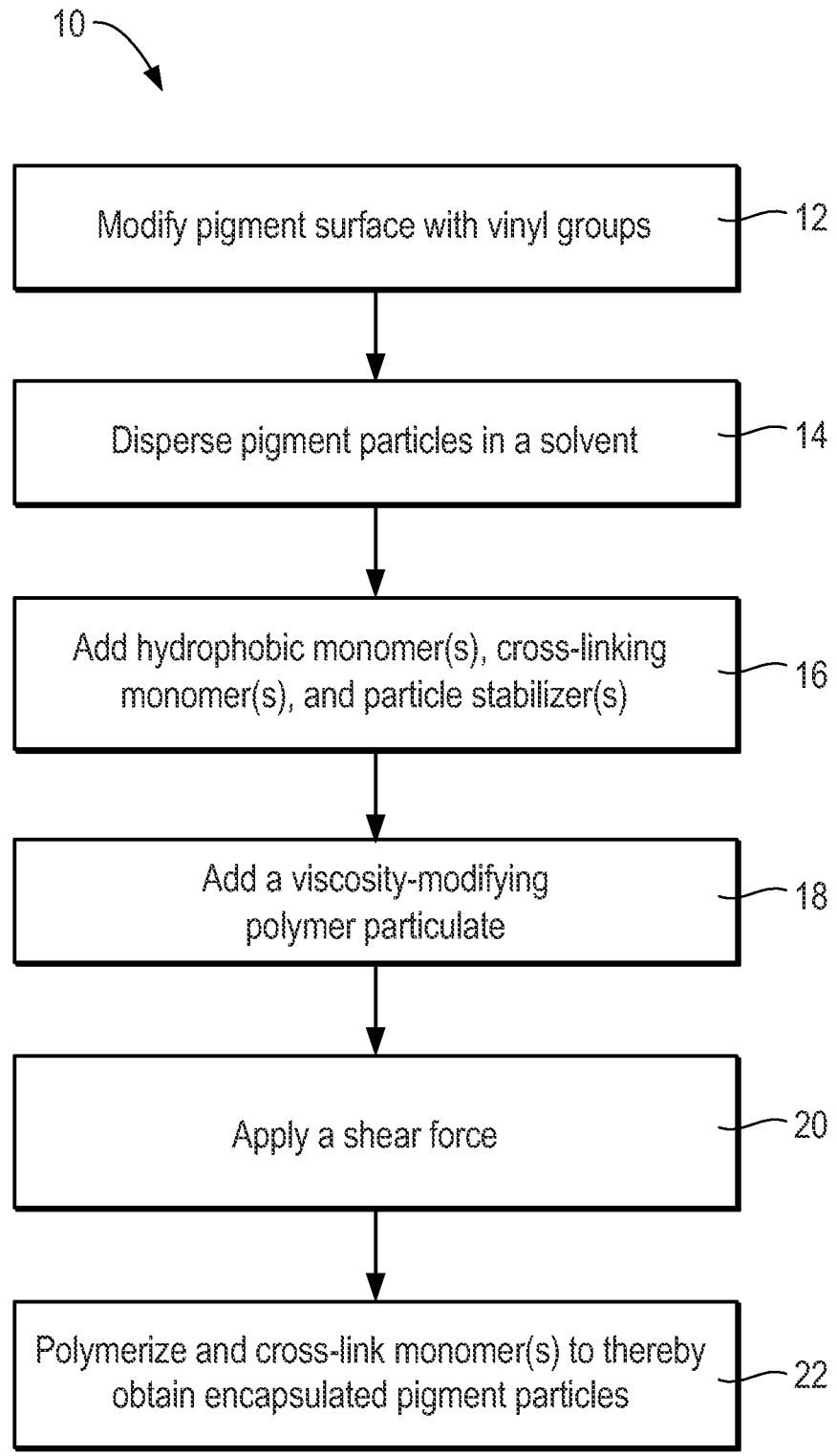

PIGMENT PARTICLES CONTAINING A VINYL GROUP AND ENCAPSULATED BY A CROSS-LINKED POLYMER

CROSS-REFERENCE TO RELATED APPLICATION

The present application is a continuation-in-part of application Ser. No. 12/862,888, filed on Aug. 25, 2010.

BACKGROUND ART

There are several reasons that inkjet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to inkjet ink chemistry, the majority of commercial inkjet inks are water-based. Thus, their constituents are generally water-soluble, as in the case of many dyes, or water dispersible, as in the case of pigments. Furthermore, inkjet inks have low viscosity to accommodate high frequency jetting and firing chamber refill processes common to thermal inkjet architecture.

Polymers are used to improve the durability of prints using a variety of printing techniques. An example is the dry toner used in the commercial printers. Use of such polymers is difficult in the case of water-based inkjet inks because of the requirement that the ink have water-like viscosity. It is technically challenging to keep these polymers in dispersion while still being able to form a print film after printing. To overcome this problem, latex polymers are commonly added since such polymers show low viscosity with higher amount of solid contents. However, the durability of such systems varies depending on the print media, compared to electrophotography or UV-based technologies. This is due to a "phase separation" of pigment and polymer particles. Recently, chemical fixers or bonding agents have been used to improve waterfastness and possibly durability. However, such a type of fixing system does not show the desired improvement in terms of rub resistance although it improves highlighter fastness.

BRIEF DESCRIPTION OF THE DRAWINGS

The sole FIGURE is a flow chart depicting an example for preparing the pigment particles.

BEST MODES

Reference is made now in detail to specific examples, which illustrate the best mode presently contemplated by the inventors for practicing the invention. Alternative examples are also briefly described as applicable.

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an inkjet ink. Liquid vehicles are known in the art, and a wide variety of ink vehicles may be used in accordance with examples of the present disclosure. Such ink vehicles may include a mixture of a variety of different agents, including without limitation, surfactants, organic solvents and cosolvents, buffers, biocides, viscosity-modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "co-solvent" refers to any solvent, including organic solvents and/or water, present in the ink vehicle, used in dispersing a pigment, or used in polymerization reactions. Such co-solvents also facilitate good nozzle health in inkjet printheads by controlling the evaporation of solvents and/or water, puddling of the ink, etc.

As used herein, "pigment" generally includes pigment colorants, magnetic particles, metallic particles, metal oxides such as aluminas, silicas, titanias and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In some examples, however, the pigment is a pigment colorant.

As used herein, "fully encapsulated" refers to a pigment that is encapsulated by a polymer such that at least 90% of the surface area of the pigment is covered by the polymer.

As used herein, "aqueous solvent system" refers to a solvent system having water as a component. The solvent system may include other cosolvents that are miscible or partially miscible in water.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" refers to nitrogen, oxygen, halogens, phosphorus, or sulfur.

As used herein, "alkyl" refers to a branched, unbranched, or cyclic saturated hydrocarbon group, which typically, although not necessarily, contains from 1 to about 8 carbon atoms. Alkyls include, but are not limited to, methyl, ethyl, n-propyl, isopropyl, n-butyl, isobutyl, t-butyl, and octyl, for example, as well as cycloalkyl groups such as cyclopentyl, and cyclohexyl, for example. As used herein, "substituted alkyl" refers to an alkyl substituted with one or more substituent groups. The term "heteroalkyl" refers to an alkyl in which at least one carbon atom is replaced with a heteroatom. If not otherwise indicated, the term "alkyl" includes unsubstituted alkyl, substituted alkyl, and heteroalkyl.

As used herein, $T_g$ is the glass transition temperature as calculated by the Fox equation: copolymer $T_g = 1/[W_a(T_gA) + W_b(T_gB) + \ldots]$ where $W_a$=weight fraction of monomer A in the copolymer and $T_gA$ is the homopolymer $T_g$ value of monomer A, $W_b$=weight fraction of monomer B and $T_gB$ is the homopolymer $T_g$ value of monomer B, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or subranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1 to 3, from 2 to 4, and from 3 to 5, etc. This same principle applies to ranges reciting only one numerical value. Furthermore, such an interpretation should apply regardless of the breadth of the range or the characteristics being described.

In accordance with an aspect of the teachings herein, the undesirable effects mentioned earlier, namely, phase separation of pigment and polymer particles, are overcome by providing the pigment particles with vinyl groups and using hydrophobic cross-linked polymers to encapsulate the pigment particles. This ensures that the polymer is always attached to pigment particles after printing.

Earlier polymer-encapsulated pigments have had to accept a lower durability of the polymer, lower adhesion to the print media, and lower strength of the printed film in order to have high printability, that is, the ability to jet the ink containing the encapsulated pigments through print nozzles without nozzle clogging or other problems.

Such earlier polymer-encapsulated pigments have invariably employed styrene as one of the monomers. When polymerized with other monomers, styrene tends to reduce the dielectric constant of the resulting polymer to a range of about 2 or so. These encapsulated polymers are easier to jet than polymers with a higher dielectric constant, because lower dielectric materials have lower cohesive energy. Thus, the interaction between the particles is less likely to lead to pigment aggregation, thereby resulting in better jettability (i.e., better jetting through the print nozzles).

Eliminating styrene as a monomer would result in printed films having higher durability of the polymer, higher adhesion to the print media, and higher strength of the printed film in order to have high printability. On the other hand, simply eliminating styrene as a monomer is insufficient, since, as indicated above, the presence of styrene improves jettability of the polymer-encapsulated pigments.

In further accordance with the teachings herein, increasing the charge on the polymer-coated pigment particles helps improve the jettability of the ink. This is accomplished by providing at least one particle stabilizer in addition to the hydrophobic monomer(s). A combination of hydrophobic monomer(s) and particle stabilizer(s), both described in greater detail below, improves jettability of the ink, even in the absence of styrene, while printed films have higher durability of the polymer, higher adhesion to the print media, and higher strength of the printed film. Increasing the charge on the polymer-coated pigment particles is achieved by providing polar moieties on the polymer; these polar moieties also enhance the interaction of the pigment in the ink with the print media. The polar-induced interaction is stronger compared to the van der Waals interaction provided by styrene units (styrene is a non-polar moiety).

The monomers (hydrophobic and particle stabilizer) employed are devised to form polymers having a high dielectric constant, equal to or greater than 2.8. Examples of functional groups on the vinylic monomers that provide the polymer with such a high dielectric constant include short-chain alkyls (with carbons from 1 to 8), esters, ethers, amides, and halogens. A dielectric constant of equal to or greater than 2.8 is found to improve printability and print properties. This value applies to the polymer, whether cross-linked or not.

While styrene alone is not employed in the monomer mixture in some examples, other than at concentrations that do not reduce the dielectric constant of the polymer to below 2.8, styrene derivatives containing the functional groups listed above may be employed in the monomer mixture, since these styrene derivatives form polymers having a dielectric constant of at least 2.8 and have functional groups that include polar moieties.

Examples of hydrophobic monomers include, but are not limited to, methyl methacrylate, ethyl methacrylate, propyl methacrylate, butyl methacrylate, hexyl methacrylate, and 2-ethylhexyl methacrylate. In the above examples, methacrylates can be replaced by the corresponding acrylates and several substituted styrenes may also be used, consistent with the polymer having a dielectric constant of at least 2.8. Styrene derivatives that may be employed may include, for example, vinylbenzyl chloride, chlorostyrenes, and acetoxystyrenes. The concentration of the hydrophobic monomer(s) may be in the range of about 80 to 98 percent by weight of the total monomer content.

Examples of free-radically polymerizable di- and poly-functional monomers include, but are not limited to ethylene glycol dimethacrylate, diethylene glycol dimethacrylate, butylene glycol dimethacrylate, pentaerythritol tri- and tetra-methacrylate, hexanediol dimethacrylate, bisphenol A dimethacrylate, and bisphenol A glycerate dimethacrylate. In the above examples, methacrylates can be replaced by the corresponding acrylates. When employed with the hydrophobic monomers, the polymerizable di- and poly-functional monomers provide a cross-linked polymer.

Particle stabilizers serve to improve jettability of inks containing the polymer-coated pigments compared to similar inks not including the particle stabilizers. Further, the particle stabilizers provide suspension of the pigment particles in solvent and thereby prevent settling out of the pigment particles. Examples of particle stabilizers include, but are not limited to, anionic stabilizers, such as acid monomers, and steric (non-ionic) stabilizers. The concentration of the particle stabilizer(s) may be in the range of about 2 to 20 percent by weight of the total monomer content.

Examples of acid-containing monomers include, but are not limited to, acrylic, methacrylic, itaconic, maleic and vinyl benzoic acids and styrenesulfonates and their derivatives. These monomers incorporate charges to the particles to stabilize those particles in water. Normally, jettability is poor without these monomers. The charge can be further enhanced by raising the pH of the medium so that the —COOH group can be converted to the corresponding salt form.

Non-ionic water-soluble monomers can be used instead of, or in conjunction with, the acid-containing monomers to increase stability of the pigment particles. In some examples, the non-ionic water-soluble monomers are based on polyethylene glycol derivatives or acrylamide derivatives. An example of one such monomer is polyethylene glycol acrylate of molecular weight 2054. Other examples include, but are not limited to, methoxy polyethylene glycol methacrylate of molecular weights such as approximately 250, 750, 1000, 2000 or 5000, acrylamide and methacrylamide.

In addition to the foregoing considerations, the monomers in the mixture can be selected to adjust the $T_g$ of the composite polymers for film-forming ability and effectiveness of the coating. The $T_g$ of the polymer may be in the range of −40° C. to +125° C. In some examples, the $T_g$ may be in the range of 0° C. to 75° C. In still other examples, the $T_g$ may be in the range of 35° C. to 50° C.

In accordance with another aspect of the invention, polymer-coating methods that employ shear forces have been found to reduce or even substantially eliminate monomer droplet formation in conjunction with the hydrophobic monomer(s) and particle stabilizer(s). Examples of these methods include, but are not limited to, microfluidization and ball-milling, such as with beads. Both methods provide monomer-coated pigment with little to no separate monomer particle formation that would lead to polymer particles.

The method for making an encapsulated pigment can include modifying the surface of the pigment particles with vinyl groups, dispersing a pigment in a solvent, adding to the solvent at least one hydrophobic monomer and at least one particle stabilizer to form a mixture of monomers, adding to the mixture a viscosity-modifying polymer particulate that is either linear or cross-linked to form a modified mixture of monomers, applying a shear force to the modified mixture of monomers, and polymerizing the modified mixture of monomers, thus forming the polymer-encapsulated pigment particles.

In addition to maintaining the droplet size, the surface of the pigment particles may be configured to attract the monomers so that the monomers will effectively coat onto the particle without forming droplets with just the monomers. The presence of vinyl groups on the attached polymer can influence this coating so that most, if not all, of the monomers get coated onto the particle after the polymerization; the polymer is formed on the surface of the pigment particles without unduly forming polymer particles alone. This improvement is expected to increase the reliability of printing with improved print properties.

The pigment surface is first modified with vinyl groups by the chemical transformation of surface functional groups such as amino or hydroxy groups. These groups are consumed during polymerization; that is, they react during polymerization.

In some cases, the polymer can be attached to the pigment surface using a linker group, such as a vinyl group attached to the surface of the pigment particle. Non-limiting examples of linker groups that contain a vinyl group include ethylene, esters, and so forth. Often, these linker groups are provided on the pigment surface by the commercial supplier of the pigment. These commercially-available pigments with linker groups already attached to the surface may be dispersed in water with one or more surfactants or mixed with monomers and dispersed with surfactant.

In any event, a monomer mixture is prepared. The monomer mixture may include at least one hydrophobic monomer and at least one particle stabilizer, with or without initiator. The monomer mixture may include the initiator in the case that solvent-soluble initiators are used. If water-soluble initiators are used, they can be added just before polymerization. The monomer mixture may also include at least one difunctional or polyfunctional monomer for cross-linking the monomer, as described above.

Examples of water-soluble initiators include, but are not limited to, ammonium persulfate, sodium persulfate, potassium persulfate, and 2,2'-azobis(2-methylpropionamidine) dihydrochloride. Examples of solvent-soluble initiators include, but are not limited to, azobisisobutyronitrile, 2,2'-azobis(2-methylpropane), 1-1'-azobis(cyclohexanecarbonitrile), and 4,4'-azobis(4-cyanovaleric acid). In some examples, redox initiators can be used, such as ferrous ammonium sulfate with potassium persulfate. In some examples, the concentration of the initiator is in the range of about 0.5 to 5 percent by weight, based on the total monomer content. In other examples, the concentration is in the range of about 1 to 3 percent by weight of the total monomer content.

The viscosity-modifying polymer particulates are then added to the monomer mixture. Examples of viscosity-modifying polymers include, but are not limited to, polymers that are soluble in their monomers and provide the mixture with a viscosity in the range of about 10 to 100 cp (centipoise). The increased viscosity helps retain the monomer-containing fluid on the surface of the pigment particle. An example of a polymer that is soluble in its monomer is polymethyl methacrylate, which is soluble in methyl methacrylate.

In one example of applying a shear force, the dispersion, or emulsion mixture, may be homogenized at high pressure by, for example, microfluidization of the pigment and monomer(s) at a pressure in the range of about 60 to 120 psi (pounds per square inch) (pressure gauge reading). In some examples, the pressure employed may be 110 psi. The pressure in the interaction chamber itself, may be about 15,000 to 25,000 psi. The microfluidization is typically carried out at room temperature (the ambient temperature of the environment surrounding the microfluidizer).

The high pressure helps to ensure that the desired droplet size of about 150 to 300 nm (nanometers) is maintained and to coat the monomer mixture on the surface of the pigment particles.

In another example of applying a shear force in the process for forming the polymer-coated pigment particles, ball-milling may be employed. Instead of employing the microfluidizer, a shear force involving the use of beads (e.g., glass or zirconia) in ball-milling may be utilized. The other process steps remain same. Whenever beads are used, they are removed after milling, i.e., just before polymerization. The beads are of a larger size compared to the droplet size, and a coarse filtration is sufficient to remove the beads from pigment/monomer mixture. In some examples, the diameter of the beads is in the range of 0.1 to 10 mm. In other examples, the diameter is in the range of 2 to 3 mm. The ball-milling is continued until homogenization is obtained and the particle size is below about 300 nm.

In either event, after the shear force has been applied, the mixture is heated to an elevated temperature, about 50° to 90° C. in order to initiate polymerization of the monomers at a reasonable rate.

Turning now to the sole FIGURE, in some examples, the pigment particles containing at least one vinyl group and encapsulated by a cross-linked polymer may be prepared by a method 10. The pigment surface may be modified 12 with vinyl groups. Such modification may be done in some examples by the chemical transformation of surface functional groups such as amino or hydroxy groups. For example, commercially-available carbon black pigment provided with amino functional groups may be used. An example of such a pigment is IJX58, available from Cabot Corp. The amino or hydroxy groups may be reacted with vinyl-containing compounds reactive groups, such as acryloyl chloride or methacryloyl chloride, or the like.

The modified pigments are dispersed 14 in a solvent, and one or more hydrophobic monomers, one or more particle stabilizers, and one or more cross-linking monomers are added 16 to the solvent to form an emulsion mixture. The ratio of pigment to total monomer may be in the range of about 0.8 to 3 by weight.

A viscosity-modifying polymer particulate may be added 18 to the mixture to adjust the viscosity of the emulsion mixture.

A shear force may be applied 20 to the emulsion mixture to homogenize the mixture. The shear force may be applied by using a microfluidizer or ball-milling, for example.

The emulsion mixture may be polymerized and cross-linked 22 to form polymer-coated (encapsulated) pigment particles, which are thereby obtained. Heating may be used to initiate the polymerization of the monomers. An initiator may be added prior to heating to aid in initiating the polymerization. The polymer-coated pigment particles that are formed may be obtained by separating out of the solvent for use in, e.g., inkjet inks. The separation may be achieved, for example, by filtration with 200 mesh filters.

It will be appreciated that some of the foregoing processes may be combined and need not follow the specific order given above.

The polymer-coated pigment particles are made into an ink formulation. The concentration of these pigment particles in the inks may range from 0.5 to 40 wt %. In some examples, the concentration may range from 1 to 15 wt %. In still other examples, the concentration may range from 2 to 6 wt %. Other additives can be added to formulate inks.

The inkjet ink can comprise an ink vehicle and any polymer-encapsulated pigment disclosed herein dispersed in the ink vehicle.

It is noted that the polymer-encapsulated pigment described herein can be further stabilized by addition of surfactants. As such, in one example, the encapsulated pigment can further comprise the addition of a reactive surfactant during the polymerization process. Generally, the reactive surfactant contains hydrophobic moieties that can be covalently bound to the surface of a polymeric particle or encapsulating polymer. Additionally, such a reactive surfactant can be incorporated during the polymerization via appropriate organic groups, e.g., a vinyl group, such that the surface of the polymer particles or the encapsulating polymer contains the reactive surfactant. Generally, the reactive surfactant can contain hydrophilic groups that allow the polymeric particles or encapsulating polymer to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in one example, the reactive surfactants can be functionalized ethylene glycol acrylates, including the SIPOMER® series of surfactants from Rhodia. Other non-limiting examples of reactive surfactants include HITENOL™ (polyoxyethyllene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAXEMUL® (anionic phosphate ester) reactive surfactants commercially available from Uniqema of the Netherlands. Suitable grades of some of the materials listed above may include HITENOL™ BC-20, NOI-GEN™ RN-30, TREM® LT-40, and MAXEMUL® 6106 and 6112.

The inkjet ink compositions of the present disclosure may also be suitable for use on many types of substrates of recording media, including but not limited to vinyl media, cellulose-based paper media, various cloth materials, polymeric materials (non-limitative examples of which include polyester white film or polyester transparent film), photo-paper (non-limiting examples of which include polyethylene or polypropylene extruded on one or both sides of paper), metals, and/or mixtures or composites thereof. A non-limiting example of a suitable metal material is a metal in foil form made from, for example, at least one of aluminum, silver, tin, copper, alloys thereof, and/or mixtures thereof.

With these parameters in place regarding some of the possible encapsulated pigments that can be formed, a discussion of dispersion fluids, e.g., inks, etc., is useful to exemplify how these encapsulated pigments can be implemented for use in accordance with an example of the present disclosure. Typically, inks can include the encapsulated pigment dispersed in a liquid vehicle. A liquid vehicle formulation that can be used with the encapsulated pigments described herein can include water, and optionally, one or more cosolvents present in total at from 0.1 wt % to 30 wt %, or more, depending on the jetting architecture. Further, one or more non-ionic, cationic, and/or anionic surfactant can optionally be present, ranging from 0.01 wt % to 10.0 wt %. The balance of the formulation can be purified water, or other vehicle components known in the art, such as biocides, viscosity-modifiers, materials for pH adjustment, sequestering agents, preservatives, and the like. In one example, the liquid vehicle can be predominantly water.

Classes of co-solvents that can be used can include organic cosolvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0 wt % to 10.0 wt %. It is to be noted that the surfactant that is described as being usable in the liquid vehicle is not the same as the surfactant that is described as being adhered to the surface of the polymer particles or encapsulating polymer, though many of the same surfactants can be used for either purpose.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetraacetic acid), may be included to eliminate the deleterious effects of heavy metal impurities, and buffer solutions may be used to control the pH of the ink. From 0 wt % to 2.0 wt %, for example, can be used. Other viscosity-modifiers and buffers may also be present, as well as other additives known to those skilled in the art to modify properties of the ink as desired. Such additives can be present at from 0 wt % to 20.0 wt %.

As a consequence of using surface-modified pigments, the pigment particles are substantially fully encapsulated. Thicker capsules are obtained, by which is meant the thickness of the polymer coating on the pigment is increased than would otherwise be the case. The formation of free polymer particles is minimized. The presence of the groups on the pigment surface also helps to disperse the pigment with monomers to form an emulsion, that is, to form droplets of pigment with the monomer(s) on the surface, prior to polymerization. The process disclosed herein leads to effective encapsulation without forming separate polymer particles.

EXAMPLES

The following examples illustrate some examples of the present pigments, inks, and methods that are presently known. However, it is to be understood that the following are only exemplary or illustrative of the application of the principles of the present compositions, systems, and methods. Numerous modifications and alternative compositions, methods, and systems may be devised by those skilled in the art without departing from the spirit and scope of the present systems and methods. The appended claims are intended to cover such modifications and arrangements. Thus, while the present pigments, inks, and methods have been described above with particularity, the following examples provide further detail in connection with what are presently deemed to be the acceptable examples.

Example 1

Pigment with Surface Acrylic Group

Carbon black with amino functional groups (IJX58) from Cabot (17.7 g) was mixed with dichloromethane (150 g) and triethylamine (25 ml). This mixture was cooled with ice and then acryloyl chloride (14.5 ml) was added. The mixture was stirred at ambient temperature for 22 h. Volatiles were removed and the pH was adjusted to about 9 by adding dilute sodium hydroxide solution. The mixture was centrifuged and washed with three times to remove the base and then dried at ambient temperature to obtain pigment with vinyl groups, specifically, acrylamido groups.

Example 2

Preparation of Polymer-Attached Pigment

The pigment from Example 1 (2 g) was mixed with the following monomers: methyl methacrylate (0.27 g), hexyl acrylate (0.27 g), and polyethylene glycol acrylate of molecular weight 2054 (0.79 g); with the following surfactants: Brij92 (0.12 g) and Aerosol DPOS 45 (0.12 g); and with glass beads of diameter about 3 mm (7 g). This mixture was milled along with water (8 g) for up to 16 h. The size of the pigment particles was monitored with time and milling was stopped once the desired size range is achieved. Beads from this mixture were removed and mixed with 5.7% ammonium persulfate (1.4 g). The mixture was heated to 75° C. for 8 h to obtain polymer-attached pigment particles in water.

Ball-milling is an alternate approach to providing the dispersion, or emulsion mixture. Similar results may be obtained by microfluidization at about 60 to 120 psi, as described above in place of ball-milling.

Example 3

Preparation of Cross-Linked Polymer-Attached Pigment

Example 2 is repeated with ethylene glycol dimethacrylate (0.013 g) added to monomers under identical conditions to obtain the encapsulated pigment particle with cross-linked polymer.

While the disclosure has been described with reference to certain preferred examples, those skilled in the art will appreciate that various modifications, changes, omissions, and substitutions can be made without departing from the spirit of the disclosure. It is intended, therefore, that the invention be limited only by the scope of the following claims.

What is claimed is:
1. An ink-jet ink, including:
an ink vehicle; and
an encapsulated pigment dispersed in the ink vehicle, the encapsulated pigment comprising pigment particles encapsulated by a cross-linked polymer, wherein the polymer has a dielectric constant of 2.8 or more, wherein the polymer is derived from monomers comprising a methoxy polyethylene glycol methacrylate, and wherein the pigment particles have a surface attached to the cross-linked polymer through reacted vinyl groups modifying the surface.
2. The inkjet ink of claim 1 wherein the monomers are essentially free of styrene and further comprise monomers selected from the group consisting of hydrophobic monomers, polymerizable difunctional and polyfunctional monomers, and particle stabilizers.
3. The ink-jet ink of claim 1 wherein the ink vehicle is an aqueous ink vehicle and the encapsulated pigment is present in the aqueous ink vehicle from about 0.5 wt% to about 40 wt% of the ink.

4. The ink-jet ink of claim 2 wherein the monomers further comprise hydrophobic monomers selected from the group consisting of methacrylates, acrylates, and styrenes having functional groups selected from the group consisting of alkyls, esters, ethers, amides, and halogens.

5. The ink-jet ink of claim 4 wherein the hydrophobic monomers are selected from the group consisting of methyl methacrylate, ethyl methacrylate, propyl methacrylate, butyl methacrylate, hexyl methacrylate, 2-ethylhexyl methacrylate, methyl acrylate, ethyl acrylate, propyl acrylate, butyl acrylate, hexyl acrylate, 2-ethylhexyl acrylate, vinylbenzyl chloride, chlorostyrenes, and acetoxystyrenes.

6. The ink-jet ink of claim 2 wherein the monomers further comprise monomers selected from the group consisting of polymerizable difunctional and polyfunctional monomers, and the polymerizable difunctional and polyfunctional monomers are selected from the group consisting of ethylene glycol dimethacrylate, diethylene glycol dimethacrylate, butylene glycol dimethacrylate, pentaerythritol tri-methacrylate, pentaerythritol tetra-methacrylate, hexanediol dimethacrylate, bisphenol A dimethacrylate, and bisphenol A glycerate dimethacrylate and the corresponding acrylates.

7. The ink-jet ink of claim 2 wherein the monomers further comprise particle stabilizers selected from the group consisting of acid monomers, and acrylamide derivatives.

8. The ink-jet ink of claim 7 wherein the acid monomers are selected from the group consisting of acrylic acid, methacrylic acid, itaconic acid, maleic acid, vinyl benzoic acid, and styrenesulfonates and derivatives thereof.

9. The ink-jet ink of claim 1 wherein the methoxy polyethylene glycol methacrylate is selected from the group consisting of methoxy polyethylene glycol methacrylate of molecular weight approximately 250, methoxy polyethylene glycol methacrylate of molecular weight approximately 750, methoxy polyethylene glycol methacrylate of molecular weight approximately 1000, methoxy polyethylene glycol methacrylate of molecular weight approximately 2000 and methoxy polyethylene glycol methacrylate of molecular weight approximately 5000.

10. The ink-jet ink of claim 7 wherein the acrylamide derivative is selected from the group consisting of acrylamide and methacrylamide.

11. The ink-jet ink of claim 1, wherein the monomers further comprise methyl methacrylate and hexyl acrylate.

12. The ink-jet ink of claim 11, wherein the monomers further comprise ethylene glycol dimethacrylate.

* * * * *

UNITED STATES PATENT AND TRADEMARK OFFICE
CERTIFICATE OF CORRECTION

| | | |
|---|---|---|
| PATENT NO. | : 9,683,113 B2 | |
| APPLICATION NO. | : 13/668510 | |
| DATED | : June 20, 2017 | |
| INVENTOR(S) | : Sivapackia Ganapathiappan et al. | |

It is certified that error appears in the above-identified patent and that said Letters Patent is hereby corrected as shown below:

In the Claims

In Column 10, Line 59, in Claim 2, delete "inkjet" and insert -- ink-jet --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*